(12) United States Patent
Zhou et al.

(10) Patent No.: US 9,656,536 B2
(45) Date of Patent: May 23, 2017

(54) SYSTEM FOR COOLING A VEHICLE COMPARTMENT

(71) Applicant: Toyota Motor Engineering & Manufacturing North America, Inc., Erlanger, KY (US)

(72) Inventors: Feng Zhou, Ann Arbor, MI (US); Ercan Mehmet Dede, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 283 days.

(21) Appl. No.: 14/636,493

(22) Filed: Mar. 3, 2015

(65) Prior Publication Data

US 2016/0257181 A1  Sep. 8, 2016

(51) Int. Cl.
   *B60H 1/32*      (2006.01)
   *B60H 1/18*      (2006.01)
   *B60H 1/00*      (2006.01)

(52) U.S. Cl.
   CPC ............ *B60H 1/3201* (2013.01); *B60H 1/18* (2013.01); *B60H 1/00392* (2013.01)

(58) Field of Classification Search
   CPC .... B60H 1/3201; B60H 1/18; B60H 1/00392; B60H 1/32; F25B 25/02; F25B 27/00
   See application file for complete search history.

(56) References Cited

U.S. PATENT DOCUMENTS

| | | | | |
|---|---|---|---|---|
| 4,307,575 A | * | 12/1981 | Frosch | B60H 1/3201 62/148 |
| 4,765,395 A | * | 8/1988 | Paeye | F25B 17/083 165/104.12 |
| 5,048,299 A | * | 9/1991 | Retallick | B60H 1/3201 62/244 |
| 5,335,719 A | | 8/1994 | Khelifa et al. | |
| 5,901,780 A | * | 5/1999 | Zeigler | B60H 1/032 123/142.5 R |
| 6,155,073 A | * | 12/2000 | Gray | F25B 17/083 62/480 |
| 7,260,947 B1 | | 8/2007 | Harrison | |
| 2003/0005721 A1 | * | 1/2003 | Sato | B60H 1/3201 62/480 |

(Continued)

FOREIGN PATENT DOCUMENTS

JP  WO 2011142352 A1 * 11/2011 ............. B60H 1/004

*Primary Examiner* — Emmanuel Duke
(74) *Attorney, Agent, or Firm* — Dinsmore & Shohl LLP

(57) ABSTRACT

A system for cooling a vehicle compartment using a twin cell thermal battery and waste heat. Cool air from the evaporators of a twin cell thermal battery system is used to chill a compartment, such as an icebox in a trunk or a cabin of a vehicle. The energy needed to create the cooling effect for the cool compartment comes directly from the waste heat of vehicle exhaust gas. The system provides for the air conditioning and charging mode to work simultaneously because of a twin cell battery configuration. A thermoelectric generator (TEG) is also provided in addition to the twin cell battery thereby making the system self-powered. The system uses energy that would otherwise be lost to the environment to provide a cooling source within the vehicle.

18 Claims, 4 Drawing Sheets

(56) References Cited

U.S. PATENT DOCUMENTS

| | | | |
|---|---|---|---|
| 2004/0093876 A1* | 5/2004 | Inagaki | B01J 20/0292 62/112 |
| 2011/0192163 A1* | 8/2011 | Kasuya | F01K 13/02 60/624 |
| 2013/0192281 A1* | 8/2013 | Nam | B60H 1/3201 62/101 |
| 2014/0053577 A1* | 2/2014 | Hirota | F25B 30/04 62/56 |

* cited by examiner

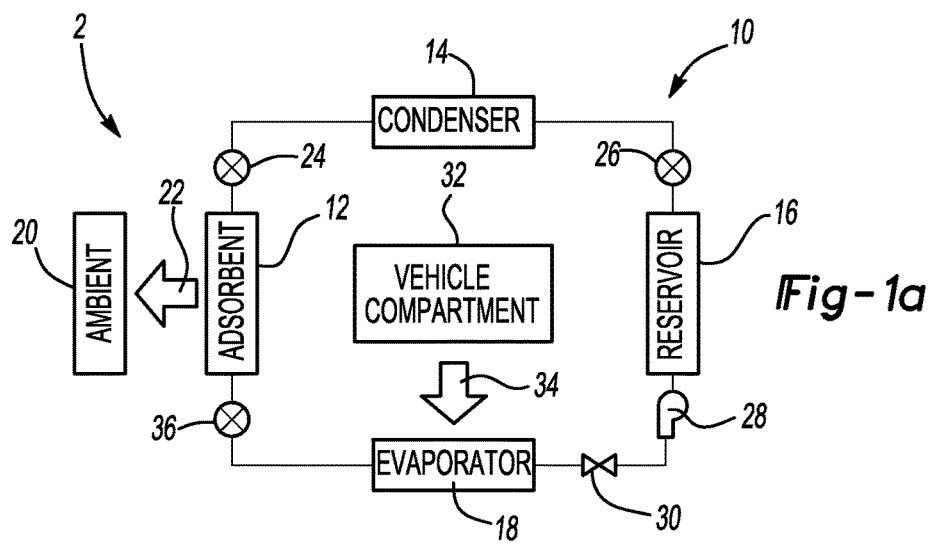
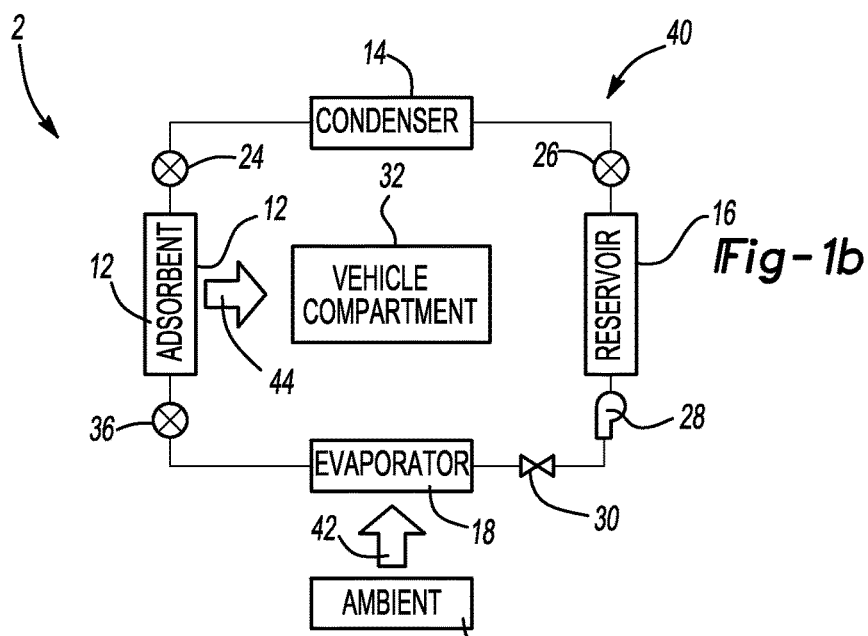
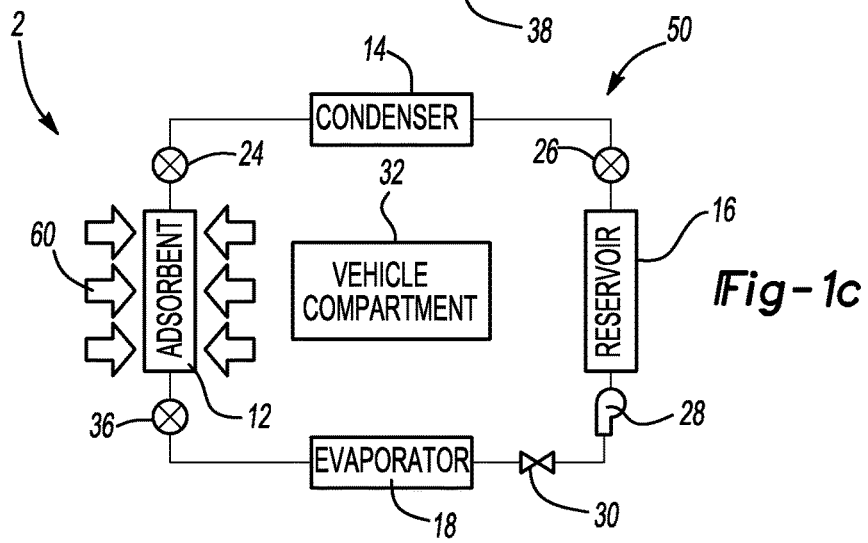

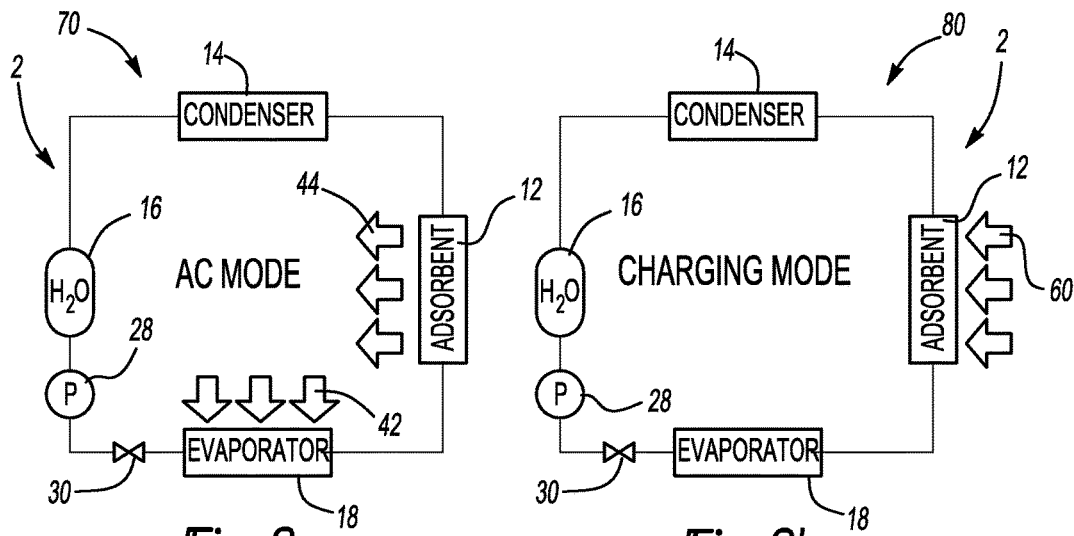
Fig-2a PRIOR ART
Fig-2b PRIOR ART
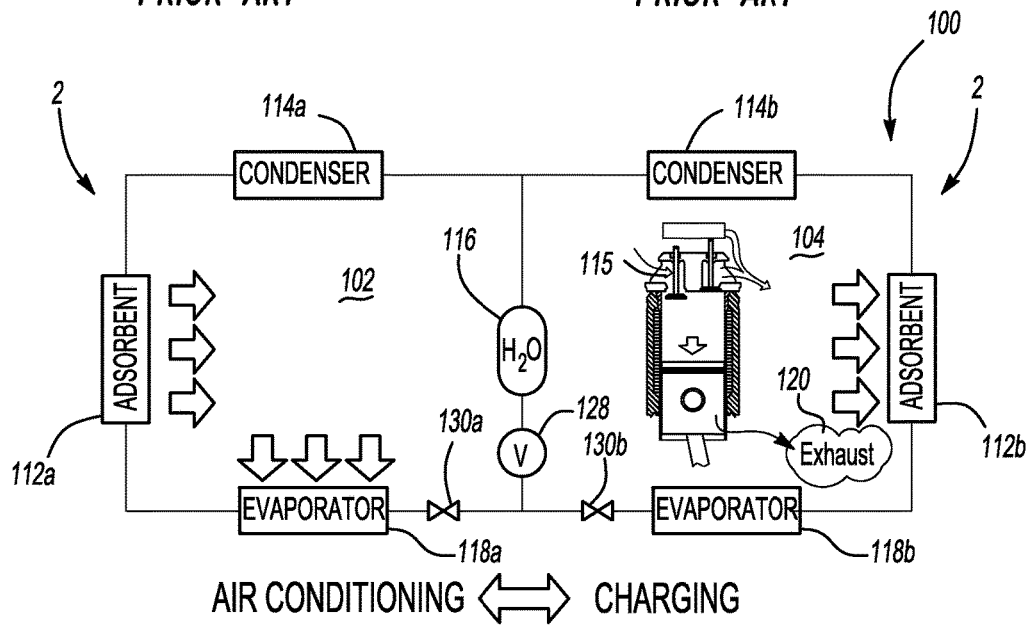
Fig-3

SYSTEM FOR COOLING A VEHICLE COMPARTMENT

FIELD OF THE INVENTION

The present invention relates generally to cooling system. More particularly, the present invention relates to a system for cooling utilizing waste heat from the exhaust of a vehicle.

BACKGROUND

The present system relates generally to cooling system. More particularly, the present system relates to a system for cooling utilizing waste heat from the exhaust of a vehicle.

It is known in the art to provide a thermal battery in fluid communication with a condenser and an evaporator wherein the thermal battery is adapted to collect heat in order to provide cooling was in a vehicle. However, these thermal batteries only have a predetermined amount of charging capability before the battery needs to be recharged.

It is known in the art to provide a single cell thermal battery within a vehicle to provide cooling to the cabin of a vehicle. FIGS. 2A and 2B illustrate the prior art of this single cell technology. Referring now to FIG. 2A: the thermal battery includes an adsorbent, a condenser, a reservoir containing water, and an evaporator. In air conditioning mode as illustrated in FIG. 2A, the adsorbent releases heat. The evaporator absorbs the heat thereby providing cooling within the vehicle. In charging mode as illustrated in FIG. 2B, the adsorbent bed absorbs the heat thereby releasing the water vapor which then condenses back to the reservoir through the condenser. The air conditioning mode as illustrated in FIG. 2A and the charging mode as illustrated in 2B cannot work simultaneously. This is a large disadvantage in that air conditioning cannot operate continuously thus not providing for reliable air conditioning or cooling within a vehicle. Accordingly, there exists a need in the art to provide a system which provides for continuous cooling of a vehicle cabin or compartment.

SUMMARY

The present system is directed to a system for cooling a vehicle compartment using a twin (or multiple) cell thermal battery and waste heat. Cold air from the evaporators of a twin cell thermal battery system is used to chill a compartment, such as an icebox in a trunk or a cabin of a vehicle. A thermoelectric assembly is used to harvest electricity from the exhaust gas. The energy needed to create the cooling effect for the cool compartment comes directly from the waste heat of vehicle exhaust gas. The system provides for the air conditioning and charging mode to work simultaneously because of a twin cell battery configuration. A thermoelectric generator (hereinafter referred to as a TEG) is also provided in addition to the twin cell battery thereby making the system self-powered. The system uses energy that would otherwise be lost to the environment to provide a cooling source within the vehicle. The system may be provided in internal combustion vehicles as well as fuel cell vehicles or hybrid vehicles. The system may also be installed with the vehicle or installed as an aftermarket configuration.

A system for cooling a vehicle compartment utilizing waste heat from a supply of exhaust gas of a vehicle, the system comprising a first battery portion having a first adsorbent, the adsorbent in fluid communication with the supply of exhaust gas, the first adsorbent adapted to collect waste heat from the supply of exhaust gas in a charging mode and further adapted to cool a supply of air in a cooling mode, the first adsorbent switchable between the charging mode and the cooling mode. A second battery portion is further provided in fluid communication with and spaced between a second condenser and a second evaporator, the second battery portion including a second adsorbent, the second battery portion in fluid communication with the supply of exhaust gas, the second adsorbent adapted to collect waste heat from the supply of exhaust gas in a charging mode and further adapted to cool a supply of air in a cooling mode, the second adsorbent switchable between the charging mode and the cooling mode. The first battery portion and the second battery portion in communication with each other. The second battery portion in the other of the charging mode or the cooling mode as compared to the first battery portion at any given time thereby providing for a continuous air cooling supply. It should be noted that the number of the battery cells is not limited to two. Three or more cells might be integrated into the system to make it function properly and efficiently. The basic rule is to make sure some of the cells are working in cooling mode when the rest of them are charged by the heat from the exhaust gas.

BRIEF DESCRIPTION OF THE DRAWINGS

FIG. 1A illustrates how the thermal battery system works in a cooling mode by illustrating the heat transfer direction;

FIG. 1B illustrates a diagram showing how the thermal battery system works in a heating mode;

FIG. 1C illustrates how the thermal battery system is charged;

FIG. 2A illustrates a single cell thermal battery of the prior art in air conditioning mode;

FIG. 2B illustrates a single cell thermal battery of the prior art operating in charging mode;

FIG. 3 illustrates a twin shell thermal battery providing for simultaneous air conditioning and charging;

DETAILED DESCRIPTION

The present system is directed to a system for cooling a vehicle compartment using a twin cell thermal battery and waste heat. Cold air from the evaporators of a twin cell thermal battery system is used to chill a compartment, such as an icebox in a trunk or a cabin of a vehicle. A thermoelectric assembly is used to harvest electricity from the exhaust gas. The energy needed to create the cooling effect for the cool compartment comes directly from the waste heat of vehicle exhaust gas. The system provides for the air conditioning and charging mode to work simultaneously because of a twin cell battery configuration. A thermoelectric generator (hereinafter referred to as a TEG) is also provided in addition to the twin cell battery thereby making the system self-powered. The system uses energy that would otherwise be lost to the environment to provide a cooling source within the vehicle. The system may be provided in internal combustion vehicles as well as fuel cell vehicles or hybrid vehicles. The system may also be installed with the vehicle or installed as an aftermarket configuration.

Figure 4:
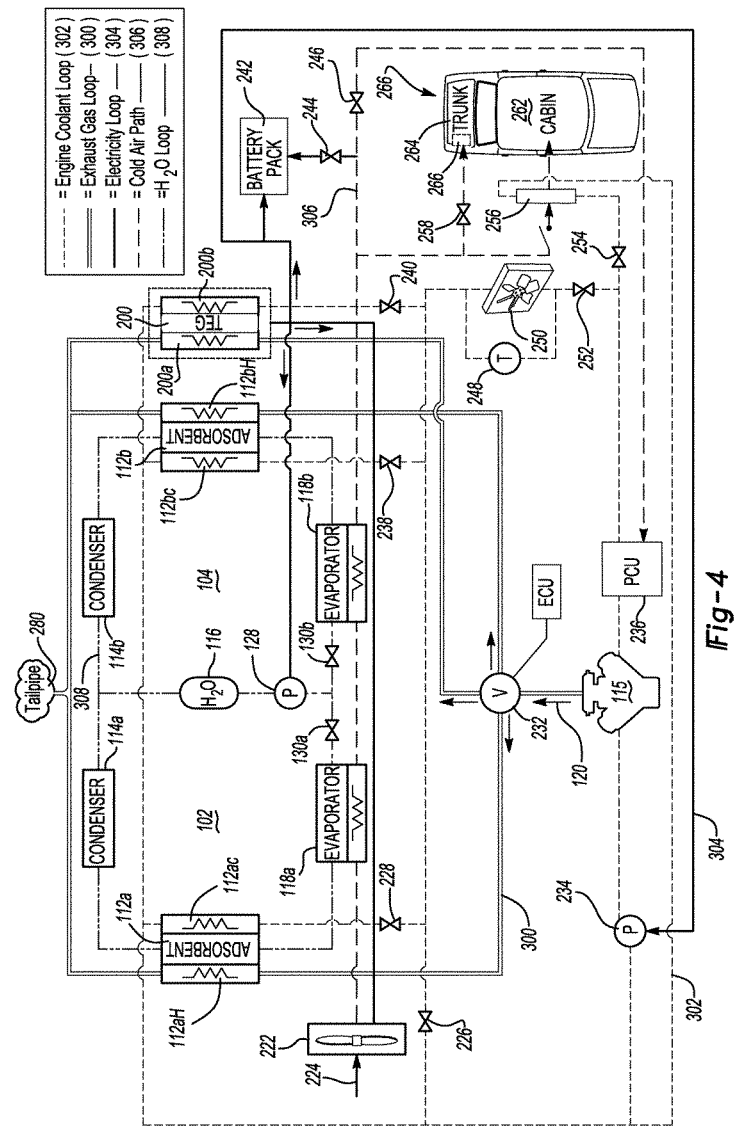
FIG. 4 illustrates a detailed system diagram of the twin cell thermal battery of the present system connected with various cooling operations.
Figure 5:
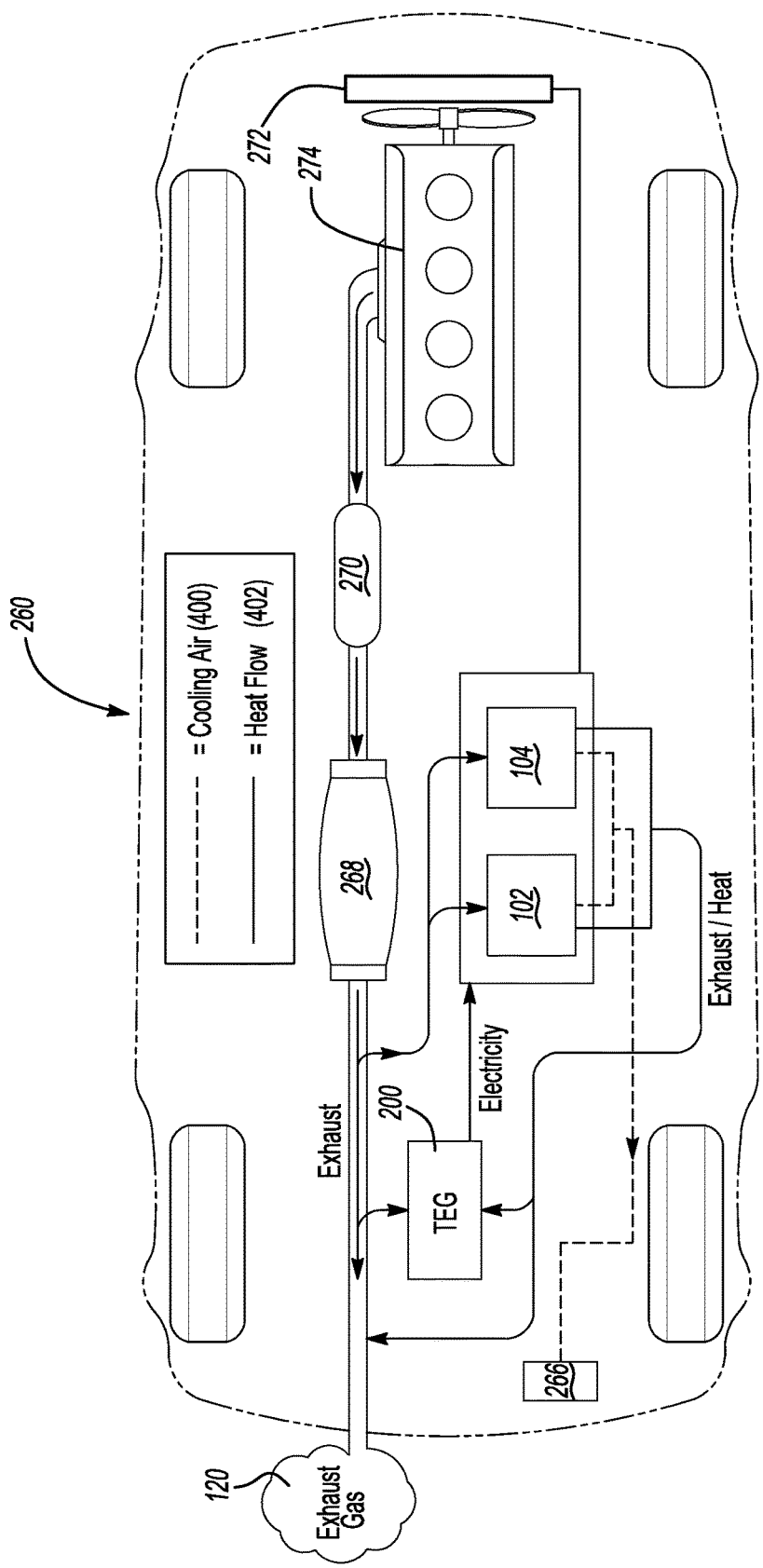
FIG. 5 illustrates the general energy flow within a vehicle using a twin cell thermal battery.

The present twin cell thermal battery system operates by charging thermal batteries from exhaust gas, such as shown in FIGS. 3-5. Furthermore, a TEG assembly is used to harvest electricity from the exhaust gas. The electricity generated from the TEG is utilized to drive a pump of the thermal battery, drive a fan, or even supply electricity to a separate battery pack.

Adsorption based thermal batteries are used in the twin cell battery configuration of the present embodiment. An adsorption based thermal battery is illustrated in FIGS. 1A-1C. The configuration as illustrated in FIG. 1A includes an adsorbent 12, a condenser 14 and a reservoir 16. The reservoir is further provided in fluid communication with an evaporator 18. FIG. 1A illustrates how the thermal battery system operates in the summer, by providing cooling to various portions of the vehicle. The arrows illustrate the direction of heat transfer. As illustrated by directional arrow, heat from the vehicle compartment 32 is transferred to the evaporator 18 thereby cooling the compartment of the vehicle. Further, heat from the adsorbent 12 is transferred to the ambient 20 surroundings as illustrated by directional arrow 22. This system results in air conditioning or cooling (as illustrated by directional arrow 34) to a vehicle compartment 32. However, this system does not allow for continuous cooling to the compartment because the adsorbent bed requires periodic heating to regenerate the adsorption material by releasing the adsorbed water vapor, so that the cooling mode can be repeated. The air conditioning mode and charging mode cannot work simultaneously in the configurations as illustrated in FIGS. 1A, 1B, 1C, 2A, and 2B.

Heating can also be accomplished of a vehicle compartment 32, such as illustrated in FIG. 1B. The configuration 40 as illustrated in FIG. 1B includes a single cell thermal battery including an adsorbent 12, the condenser 14, the reservoir 16, and the evaporator 18. The adsorbent 12 is fluidly connected to the condenser 14 and the evaporator 18 by means of various connection points 24, 36. Furthermore, the condenser 14 is connected to the reservoir and the adsorbent 12 by means of connection points 24, 26. Furthermore, a pump and a valve are positioned between the reservoir 16 and the evaporator 18 to control fluid flow within the system. The system as illustrated in FIG. 1B illustrates how the thermal battery system operates in a heating mode. Heat from the adsorbent 12 is transferred to the electric vehicle compartment 32 as illustrated by directional arrow 44. Heat from the ambient 38 surroundings is transferred to the evaporator 18 as illustrated by the directional arrow 42.

The charging mode of the thermal battery 2 is illustrated in FIG. 1C. The charging system 50 includes the adsorbent 12 fluidly connected to the condenser 14 further fluidly connected to the reservoir 16 and the evaporator 18. Various connection points 24. 26. 28, 36 are provided between the main elements of the charging system. Such as in the other systems, a pump 28 and a valve 30 are provided positioned between the reservoir 16 and the evaporator 18 to control fluid flow between the elements of the system 50. The charging system can only operate when the cooling or heating, such as shown in FIGS. 1A and 1B, is not occurring. Charging occurs when heat is applied or exposed to the adsorbent 12. The heat is illustrated by directional arrows 60 being absorbed into the adsorbent 12. Heat transferred to the adsorbent 12 releases the water vapor being trapped within the adsorbent bed. The water vapor then condenses back to the reservoir through the condenser. In a typical embodiment, heat with a temperature 200° Celsius is applied to the adsorbent 12 during charging. However, in different embodiments, the heat temperature may be lower or higher than 200° Celsius. In the prior art, this heat is applied to the adsorbent 12 when charging the vehicle battery pack.

A conduit connects all components of the system to transport cooled air to the compartment.

It is known in the art to provide a single cell thermal battery within a vehicle to provide cooling to the cabin of an electric vehicle. FIGS. 2A and 2B illustrate the prior art of this single cell technology. Referring now to FIG. 2A. The system 70 includes the thermal battery 2 includes the adsorbent 12, the condenser 14, the reservoir 16 containing water, and the evaporator 18. In air conditioning mode as illustrated in FIG. 2A, the system 10 illustrates the adsorbent 12 releasing heat as illustrated by directional arrow 44. The evaporator 18 absorbs the heat (as shown by directional arrow 42) thereby providing cooling within the vehicle. The AC mode as illustrated in FIG. 2A and the charging mode as illustrated by the system 80 as shown in 2B cannot work simultaneously. This is a great disadvantage in that air conditioning cannot operate continuously thus not providing for reliable air conditioning or cooling within a vehicle. Therefore the single cell thermal battery can only be applied to an electric vehicle, so that the thermal battery can be charged when the vehicle battery pack is being charged. Accordingly, there exists a need in the art to provide a system which provides for continuous cooling of a vehicle compartment 32 for other types of vehicles such as traditional internal combustion engine vehicle, hybrid electric vehicle, fuel cell vehicle, etc.

A twin cell thermal battery system 100 allows for air conditioning (or cooling) and charging to work simultaneously is illustrated in FIG. 3. The twin cell battery system includes two thermal battery systems (also referred to as first battery portion and second battery portion). Each battery portion includes an adsorbent 112a, 112b, a condenser 114a, 114b, and an evaporator 118a, 118b. A reservoir 116 is further provided to supply water to both systems. Each of the elements is fluidly connected to one another and may be separated by various valves or pumps. A pump 128 is provided fluidly connected between the reservoir 116 and both evaporators 118a, 118b, such as illustrated in FIG. 3 to drive water through the expansion valves 130a, 130b depending on which batter is in AC mode. The two sides of the system work simultaneously, either providing air conditioning or charging the adsorbents. Once the adsorbents 112a or 112b are fully charged, the charged battery cell switches to air conditioning mode and the other battery cell switches to charging mode. Once the charge of the charged cell is depleted, or once the charge for the other cell is complete, the two cells switches modes. This switching between air conditioning mode and charging mode continuously occurs during the entire operation of the vehicle, or at least until cooling is desired. The pump 128 is adapted to drive the fluid into the evaporators 118a, 118b. Furthermore, expansion valves 130a, 130b are provided between the reservoir 116 and the evaporators 118a, 118b to control the fluid flow into the evaporators 118a, 118b.

An engine 115 is a typical engine from either an internal combustion engine, or a similar engine as provided in a fuel cell vehicle or a hybrid vehicle. The engine 115 is adapted to expel a supply of exhaust gas 120. The exhaust gas 120 is generally considered waste gas having waste heat. The exhaust gas 120 is very hot with temperatures exceeding 200° Celsius. This waste heat within the exhaust gas 120 is cycled through the adsorbents 112a and 112b during the charging of the adsorbents 112a, 112b. The heat within the exhaust gas 120 is absorbed into the adsorbents 112a, 112b in an effort to reduce waste which would otherwise have been lost through the tailpipe 280 of the vehicle.

The exhaust gas loop 300 is illustrated in FIG. 4. The exhaust gas 120 leaves the engine 115 and enters a control valve 232. The control valve 232 directs the exhaust gas 120 to either the adsorbent 112a, the adsorbent 112b, or the TEG 200. The waste heat from the exhaust gas 120 is absorbed into the hot side 112aH of the adsorbent 112a. The heat from the exhaust gas 120 is further absorbed into the hot side 112bH of the adsorbent 112b. To clarify, the exhaust gas doesn't flow through 112a and 112b in series. It flows to 112a or 112b depending on which one is in charging mode. When the battery portion is in AC mode, the evaporator generates cooling effect while the adsorbent bed generates heat which needs to be removed from the adsorbent bed. Here we use engine coolant which flows through 112aC (if the battery portion 102 is in AC mode) or 112bC (if the battery portion 104 is in AC mode) to carry away the heat. The heat carried by the engine coolant could be used to warm the vehicle compartment (if the vehicle compartment needs heating) or dumped to the environment through radiator (if the vehicle compartment needs cooling). Furthermore, the hot side 200a of the TEG 200 further absorbs the heat from the exhaust gas 120. The TEG and two thermal battery portions are in parallel. The exhaust gas is split 3 ways. If one of the battery portion needs charging, then part of or all of the exhaust gas would flow to that battery portion. If no charging is needed, all the exhaust gas would flow to the TEG. Absorption of the heat to the adsorbents 112a, 112b only occurs during a charging mode.

The valve 232 may be connected to an electronic control unit (ECU) which determines where the valve 232 should direct the exhaust gas 120. If the first thermal battery is in air conditioning mode, then the valve 232 will direct the exhaust gas 120 to the second thermal battery which is in charging mode. The valve 232 is also operable to direct the exhaust gas 120 to one of the adsorbents 112a, 112b and to the TEG 200 at the same time. An engine coolant loop is further provided in fluid communication with the adsorbents 112a, 112b, the TEG 200 assembly, the radiator 250, and an air conditioning unit 256. A temperature control device or thermometer 248 is connected to the air conditioning unit 256. The engine coolant loop is powered by a pump 234. The pump 234 is adapted to pump the engine coolant through the system and to the adsorbents 112a, 112b. The engine coolant may be further heated by the adsorbents 112a, 112b and the TEG 200 assembly. The engine coolant loop 302, the exhaust gas loop 300, the electricity loop 304, the cold air path 306 and the water loop 308 are all connected by means of a plurality of conduits and valves 226, 228, 238, 252, 254, 240, 258, 246.

An electricity loop 304 is powered at least in part by the TEG 200 assembly. In some embodiments the TEG 200 assembly provides full power to the system as illustrated in FIG. 4. The TEG 200 assembly includes a hot side 200a and a cool side 200b. The exhaust gas flows through the heat exchanger attached to the hot side 200a while the engine coolant flows through the heat exchanger attached to the cool side 200b. The TEG 200 assembly harvests electricity because of the temperature difference between the hot side 200a and the cool side 200b. The TEG 200 converts heat (temperature differences) directly into electrical energy using the Seebeck effect. The temperature difference between the sides 200a, 200b creates electrical energy to be used elsewhere within the system.

The electricity loop 304 extends away from the TEG 200 to supply power to the pump 128, the fan (or cooling fan) 222, the battery pack 242, and/or the pump 234. Inclusion of the TEG 200 device allows for the entire system to be self-powered with only the supply of heat from the exhaust gas 120. A cold (or cool) air path 306 originates from the evaporators 118a, 118b. Outside air 224 is blown through the fan 222 through the evaporators 118a, 118b and to the various areas which need to be cooled. In one embodiment, the cold air extends through a valve 244 to the battery pack 242 to cool the battery pack 242.

In another embodiment, cold air is supplied to the PCU 236 for cooling. In another embodiment, the cold air path 306 supplies cold air to the trunk 264, or more specifically, a compartment within the trunk 264. The compartment 266 within the trunk may be a typical refrigerator, icebox, or other cooling compartment for food or beverages. In another embodiment, the compartment 266 may be a cooler for transport or emergency transport of blood, organs, or other tissues for hospital and surgical use. Such a compartment may be used in an ambulance or other transport vehicle for storing these items. In another embodiment, the cold air 306 is provided to an air conditioning unit 256 to supply cold air to a cabin 262 of a vehicle.

A water loop 308 is provided connected between the two thermal batteries. Water from the reservoir 116 flows through the pump 128 to the evaporators 118a, 118b, the adsorbents 112a, 112b, and the condensers 114a, 114b and back to the reservoir 116. The water within the water loop 308 is adapted to transfer heat between the evaporators 118a, 118b, the adsorbents 112a, 112b, and the condensers 114a, 114b. Water is recycled through the system and returned to the reservoir 116.

The general energy flow path 260 is illustrated in FIG. 5. The twin cell thermal battery system is illustrated by the first battery system (or first battery portion) 102 and the second battery system (or second battery portion) 104. The cooling air loop is illustrated by the dashed line 400. Heat flow is illustrated by the line 402. The TEG 200 is provided in communication with the twin cell battery system (or portions) 102, 104. The TEG communicates to the twin cell battery in that the TEG might provide electricity to the components of the twin cell battery system that need power. Therefore the connection between TEG and thermal battery shown in FIG. 5 should be providing electricity.

The trunk, or trunk compartment 266 is provided showing the heat flow (cold air) to the compartment 266. Exhaust gas from the fan 272 and engine 274 flows through the catalytic converter 270, through the muffler 268 and through the thermal batteries 102, 104 to supply heat to the adsorbents. The exhaust gas then flows back to the tailpipe and into the environment. The location where the exhaust gas is pulled out of the emission system to provide heat to the thermal batteries and TEG is not necessarily after the muffler 268. It could be between the muffler 268 and catalytic converter 270 or even before the catalytic converter 270, depending on how the twin cell battery system is designed and integrated into the vehicle. At least some of the exhaust gas 120 having the heat flows into the TEG 200 and to the twin cell batteries (or portions) 102, 104.

The invention is not restricted to the illustrative examples and embodiments described above. The embodiments are not intended as limitations on the scope of the invention. Methods, apparatus, compositions, and the like described herein are exemplary and not intended as limitations on the scope of the system. The scope of the invention is defined by the scope of the appended claims.

What is claimed is:

1. A system for cooling a vehicle compartment utilizing waste heat from a supply of exhaust gas of a vehicle, the system comprising:
   a first battery portion having a first condenser and a first evaporator, the first battery portion including a first adsorbent, the first battery portion in communication with the supply of exhaust gas through a first heat exchanger, the first adsorbent adapted to collect waste heat from the supply of exhaust gas in a charging mode, the first evaporator in communication with a supply of air, the first evaporator adapted to cool the supply of air in a cooling mode, the first battery portion switchable between the charging mode and the cooling mode;
   a second battery portion having a second condenser and a second evaporator, the second battery portion including a second adsorbent, the second battery portion in communication with the supply of exhaust gas through a second heat exchanger, the second adsorbent adapted to collect waste heat from the supply of exhaust gas in a charging mode, the second evaporator in communication with a supply of air, the second evaporator adapted to cool the supply of air in a cooling mode, the second battery portion switchable between the charging mode and the cooling mode;
   the supply of air transported to a compartment by a conduit after the supply of air has been cooled;
   the first battery portion and the second battery portion in communication with each other;
   the second battery portion in the other of the charging mode or the cooling mode as compared to the first battery portion at any given time thereby providing for a continuous air cooling supply.

2. The system for cooling the vehicle compartment of claim 1 wherein a thermoelectric generator is provided in communication with both the first battery portion and the second battery portion thereby enabling the system to be self-powered.

3. The system for cooling the vehicle compartment of claim 2 wherein the thermoelectric generator is adapted to supply electric power to a pump, the pump adapted to move engine coolant in fluid communication with the first adsorbent and the second adsorbent.

4. The system for cooling the vehicle compartment of claim 2 wherein the thermoelectric generator adapted to supply electric power to a fan, the fan in fluid communication with both the first evaporator and the second evaporator and adapted to move cool air to the vehicle compartment.

5. The system for cooling the vehicle compartment of claim 3 wherein the thermoelectric generator adapted to supply electric power to an expansion valve, the expansion valve positioned between the evaporator and the pump.

6. The system for cooling the vehicle compartment of claim 1 wherein the vehicle compartment is a vehicle cabin.

7. The system for cooling the vehicle compartment of claim 1 wherein the vehicle compartment is an ice box.

8. The system for cooling the vehicle compartment of claim 1 wherein the vehicle compartment is a compartment adapted for transporting at least one of blood, organs or other living tissue.

9. The system for cooling the vehicle compartment of claim 1 wherein if two heat exchanges are used, the first adsorbent is positioned between the first condenser and the first evaporator.

10. The system for cooling the vehicle compartment of claim 1 wherein if two heat exchanges are used, the second adsorbent is positioned between the second condenser and the second evaporator.

11. The system for cooling the vehicle compartment of claim 1 wherein both the first battery portion and the second battery portions are in fluid communication with a shared reservoir.

12. The system for cooling the vehicle compartment of claim 1 wherein the condenser and the evaporator are the same component which works as a condenser in the charging mode and functions as an evaporator in the cooling mode.

13. The system for cooling the vehicle compartment of claim 12 wherein the vehicle compartment is a compartment adapted for transporting at least one of blood, organs or other living tissue.

14. The system for cooling the vehicle compartment of claim 1 wherein the heat exchangers having at least a condenser and/or an evaporator.

15. A system for cooling a vehicle compartment utilizing waste heat from a supply of exhaust gas of a vehicle, the system comprising:
   a first battery portion having a first adsorbent, the first adsorbent directly connected to a heat exchanger, the adsorbent in fluid communication with the supply of exhaust gas, the first adsorbent adapted to collect waste heat from the supply of exhaust gas in a charging mode, the first battery portion adapted to cool a supply of air in a cooling mode, the first battery portion switchable between the charging mode and the cooling mode;
   a second battery portion including a second adsorbent, the second adsorbent directly connected to a heat exchanger, the second battery portion in communication with the supply of exhaust gas, the second adsorbent adapted to collect waste heat from the supply of exhaust gas in a charging mode and further adapted to cool a supply of air in a cooling mode, the second battery portion switchable between the charging mode and the cooling mode;
   the first battery portion and the second battery portion are connected to each other;
   the second battery portion in the other of the charging mode or the cooling mode as compared to the first battery portion at any given time thereby providing for a continuous air cooling supply.

16. The system for cooling the vehicle compartment of claim 15 wherein a thermoelectric generator is provided in communication with both the first battery portion and the second battery portion thereby enabling the system to be self-powered.

17. The system for cooling the vehicle compartment of claim 16 wherein the thermoelectric generator adapted to supply electric power to a fan, the fan in communication with both a first evaporator and a second evaporator and adapted to move cool air to the vehicle compartment.

18. The system for cooling the vehicle compartment of claim 16 wherein the thermoelectric generator adapted to supply electric power an expansion valve, the expansion valve positioned between the evaporator and a pump.

* * * * *